US011221290B2

(12) United States Patent
Blandin

(10) Patent No.: US 11,221,290 B2
(45) Date of Patent: Jan. 11, 2022

(54) METHOD FOR OBSERVING A SAMPLE BY LENSLESS IMAGING

(71) Applicant: COMMISSARIAT A L'ENERGIE ATOMIQUE ET AUX ENERGIES ALTERNATIVES, Paris (FR)

(72) Inventor: Pierre Blandin, Coublevi (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 840 days.

(21) Appl. No.: 16/065,527

(22) PCT Filed: Dec. 22, 2016

(86) PCT No.: PCT/FR2016/053648
§ 371 (c)(1),
(2) Date: Jun. 22, 2018

(87) PCT Pub. No.: WO2017/109428
PCT Pub. Date: Jun. 29, 2017

(65) Prior Publication Data
US 2021/0208053 A1 Jul. 8, 2021

(30) Foreign Application Priority Data
Dec. 24, 2015 (FR) ...................................... 1563320

(51) Int. Cl.
*G01N 15/14* (2006.01)
*G03H 1/04* (2006.01)
(Continued)

(52) U.S. Cl.
CPC ..... *G01N 15/1434* (2013.01); *G01N 15/1475* (2013.01); *G03H 1/0443* (2013.01);
(Continued)

(58) Field of Classification Search
CPC .................................................. G01N 15/1434
(Continued)

(56) References Cited

U.S. PATENT DOCUMENTS 5,449,901 A * 9/1995 Fujihira ................ B82Y 20/00
250/234
2006/0279819 A1* 12/2006 Krneta .................. G01J 9/0246
359/15

(Continued)

FOREIGN PATENT DOCUMENTS

CN 101471332 A 7/2009
WO WO 2015/011096 A1 1/2015

OTHER PUBLICATIONS

International Search Report dated Mar. 24, 2017 in PCT/FR2016/053648 filed Dec. 22, 2016.

*Primary Examiner* — Tarifur R Chowdhury
*Assistant Examiner* — Omar H Nixon
(74) *Attorney, Agent, or Firm* — Oblon, McClelland, Maier & Neustadt, L.L.P.

(57) ABSTRACT

A method for observing a sample by lensless imaging, in which a sample is positioned between a laser diode and an image sensor, the laser diode being supplied with a supply current whose intensity is less than or equal to a critical value. This critical intensity is determined during preliminary operations, during which the intensity is initially greater than a laser threshold of the diode. By observing the image formed at the image sensor, the intensity is decreased until an attenuation of the interference images on the formed image is observed, the critical intensity corresponding to the intensity at which this attenuation is optimum.

12 Claims, 7 Drawing Sheets

(51) Int. Cl.
*G01N 15/00* (2006.01)
*G01N 15/10* (2006.01)

(52) U.S. Cl.
CPC ... *G03H 1/0465* (2013.01); *G01N 2015/0053* (2013.01); *G01N 2015/1006* (2013.01); *G01N 2015/1454* (2013.01); *G03H 2001/0447* (2013.01); *G03H 2001/0452* (2013.01); *G03H 2222/12* (2013.01)

(58) Field of Classification Search
USPC .................................................... 356/522
See application file for complete search history.

(56) References Cited

U.S. PATENT DOCUMENTS

| | | | |
|---|---|---|---|
| 2007/0253454 A1 | 11/2007 | Gustavson et al. | |
| 2010/0078575 A1* | 4/2010 | Reilly | G01N 21/553 |
| | | | 250/458.1 |
| 2012/0019809 A1* | 1/2012 | Shirley | G01B 11/2441 |
| | | | 356/51 |
| 2012/0120485 A1* | 5/2012 | Ootomo | G02B 21/0016 |
| | | | 359/370 |
| 2014/0028997 A1* | 1/2014 | Cable | H01S 5/0651 |
| | | | 356/51 |
| 2016/0160174 A1 | 6/2016 | Allier | |
| 2016/0320173 A1* | 11/2016 | Royo | G01S 17/32 |
| 2017/0138846 A1* | 5/2017 | Alizadeh | G01N 21/274 |

* cited by examiner

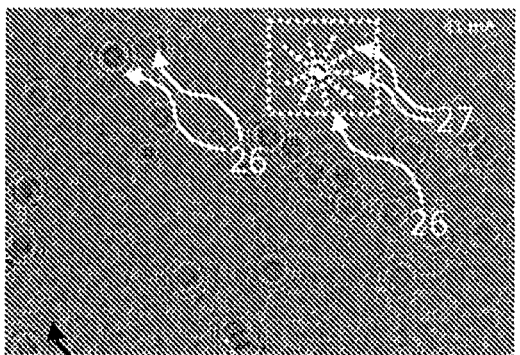
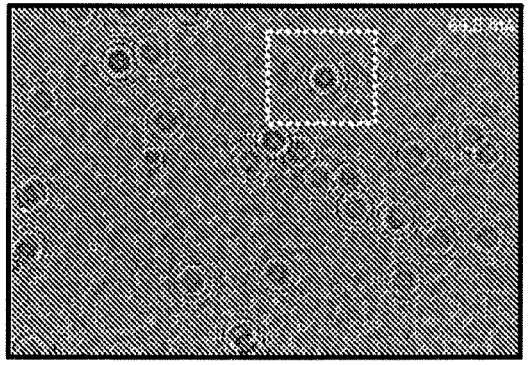
Fig. 3A    Fig. 3B
25
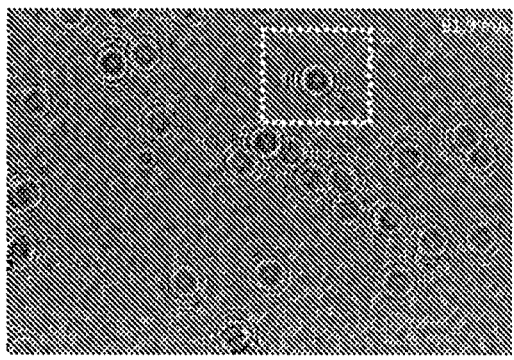
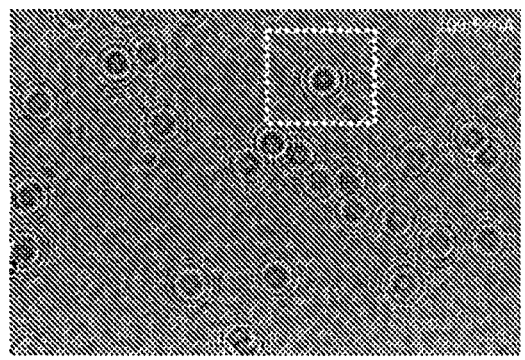
Fig. 3C    Fig. 3D
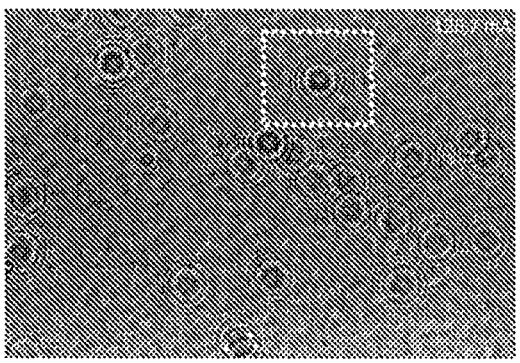
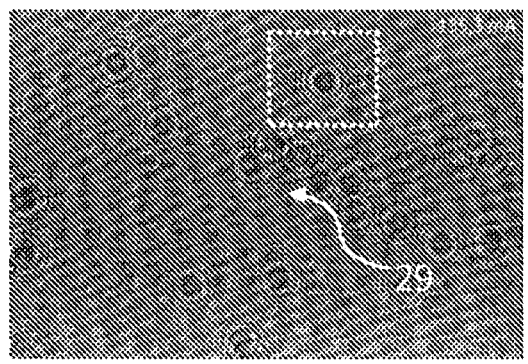
Fig. 3E    Fig. 3F

METHOD FOR OBSERVING A SAMPLE BY LENSLESS IMAGING

TECHNICAL FIELD

The technical field of the invention is linked to the observation of a sample, in particular a biological sample, by lensless imaging.

PRIOR ART

The observation of samples, in particular biological samples, by lensless imaging has undergone significant advances in the last ten years. This technique allows a sample to be observed by positioning it between a light source and an image sensor, without positioning an optical magnifying lens between the sample and the image sensor. The image sensor thus collects an image of a light wave that is transmitted by the sample.

This image is formed of interference patterns between the light wave emitted by the source and transmitted by the sample and diffraction waves resulting from the diffraction, by the sample, of the light wave emitted by the source. These interference patterns are sometimes referred to using the term 'diffraction patterns'. The image formed on the image sensor may be processed by a digital propagation algorithm, so as to estimate optical properties of the sample. Such algorithms are well known in the field of holographic reconstruction. To this end, with the distance between the sample and the image sensor being known, a holographic reconstruction algorithm, taking this distance into account, is applied.

The publication by Garcia-Sucerquia J., 'Digital in-line holographic microscopy', Applied Optics, Vol. 45, No. 5, Feb. 10, 2006, describes the observation of particles, for example biological particles, using a laser beam, and the application of reconstruction algorithms to images formed on a CCD sensor.

Document WO2008090330 has shown that, by replacing the laser light source with a light-emitting diode, with spatial filtering, it was possible to obtain a usable image of biological samples, in this case of cells, by lensless imaging. The device described in this document makes it possible to associate, with each cell, an interference pattern whose morphology makes it possible to identify the type of cell. Further publications followed, confirming the benefit of such a technology, for example application US2012/0218379.

At present, lensless imaging appears to be a simple and inexpensive alternative to a conventional microscope. Moreover, its field of observation is significantly larger than is possible for that of a microscope. It is then understood that the application prospects linked to this technology are huge.

The inventors propose a method for observing a sample that is improved in comparison with the methods described above, making it possible to obtain images whose signal-to-noise ratio is improved in comparison with the prior art.

DISCLOSURE OF THE INVENTION

A first subject of the invention is a method for observing a sample, including the following steps:
a) illuminating said sample using a laser diode that is able to emit an incident light wave, said laser diode being supplied with a supply current, such that a laser effect is obtained when an intensity of said supply current exceeds an intensity termed threshold intensity;
b) acquiring, using an image sensor, an image of the sample, the sample being positioned between the laser diode and the image sensor, each image being representative of a light wave transmitted by the sample under the effect of said illumination;

the method being characterized in that the intensity of the supply current of said laser diode is less than or equal to what is termed a critical intensity, said critical intensity being determined, prior to step a), according to the following preliminary steps:
  i) positioning said laser diode such that the incident light wave that it emits propagates as far as the image sensor;
  ii) supplying said laser diode with what is termed an initial supply current whose intensity is greater than or equal to said threshold intensity, and acquiring an image, termed initial image, using said image sensor, said initial image including transverse interference fringes extending through the image;
  iii) modifying the intensity of said supply current and acquiring an image using the image sensor, this step being repeated until an image is acquired on which said interference fringes are attenuated in comparison with said initial image, the intensity of the current then corresponding to said critical intensity.

Attenuated interference fringes is understood to mean that these interference fringes are not visible or, when they are visible, are attenuated in comparison with those of the initial image. Two adjacent transverse interference fringes, on the initial image, may be characterized by a contrast indicator representing a contrast between said interference fringes. An attenuation corresponds to a reduction in said contrast indicator of at least 25%, or even more.

The method may include any one of the following features, taken alone or in technically feasible combinations:
  Said critical intensity is less than said threshold intensity. It may be between 0.5 times the threshold intensity and the threshold intensity, and preferably between 0.7 times or 0.8 times the threshold intensity and the threshold intensity.
  In preliminary steps i) to iii), a reference sample, representative of said observed sample, is positioned between the image sensor and the laser diode. As an alternative, in preliminary steps i) to iii), no sample is positioned between the image sensor and the laser diode.
  The sample includes a diffractive element, able to form a diffraction wave under the effect of the illumination by said light wave, such that the image sensor is exposed to a wave, termed exposure wave, including the incident light wave transmitted by the sample, and also said diffraction wave. The sample may in particular include a liquid, such as a biological liquid in which particles are suspended, the thickness of the sample being for example between 50 μm and 2 cm. The sample may also be a slide of tissue whose thickness is less than 50 μm.
  In step b), the intensity of the supply current is between 0.5 times the threshold intensity and said threshold intensity, or even between 0.5 times the threshold intensity and 0.9 times the threshold intensity. Preferably, this intensity is between 0.7 and 0.9 to 0.95 or 1 times the threshold intensity.
  The laser diode emits in the visible spectral domain.

Another subject of the invention is a method for observing a sample, including the following steps:

a) illuminating said sample using a laser diode that is able to produce a light wave, termed incident light wave, propagating toward the sample;

b) acquiring, using an image sensor, an image of the sample, formed in a detection plane, the sample being positioned between the laser diode and the image sensor, each image being representative of a light wave transmitted by the sample under the effect of said illumination;

the method being characterized in that said laser diode has associated with it a threshold intensity, corresponding to an intensity of a supply current of the diode beyond which a laser effect is obtained, and that, when the sample is illuminated, the laser diode is supplied with a supply current whose intensity is strictly less than the threshold intensity, for example between 0.5 times the threshold intensity and said threshold intensity.

Preferably, the intensity is between 0.7 times the threshold intensity and 0.9 to 0.95 times the threshold intensity.

Other advantages and features will become more clearly apparent from the following description of particular embodiments of the invention, which are given by way of non-limiting example and shown in the appended figures, in which:

FIGURES

FIG. 1 shows an exemplary device for observing a sample.

FIG. 2A shows an evolution of the light power emitted by a laser diode as a function of the intensity of the supply current of said laser diode. FIG. 2B shows an evolution of the light spectrum of a laser diode as a function of the intensity of the supply current of the laser diode. FIG. 2C shows an evolution of the coherence length of the light wave emitted by said laser diode as a function of the intensity of the supply current of the laser diode.

FIGS. 3A, 3B, 3C, 3D, 3E and 3F show images of a sample that are obtained using the device described with reference to FIG. 1, considering various intensities of the supply current of the laser diode for illuminating the sample.

DISCLOSURE OF PARTICULAR EMBODIMENTS

Figure 1:
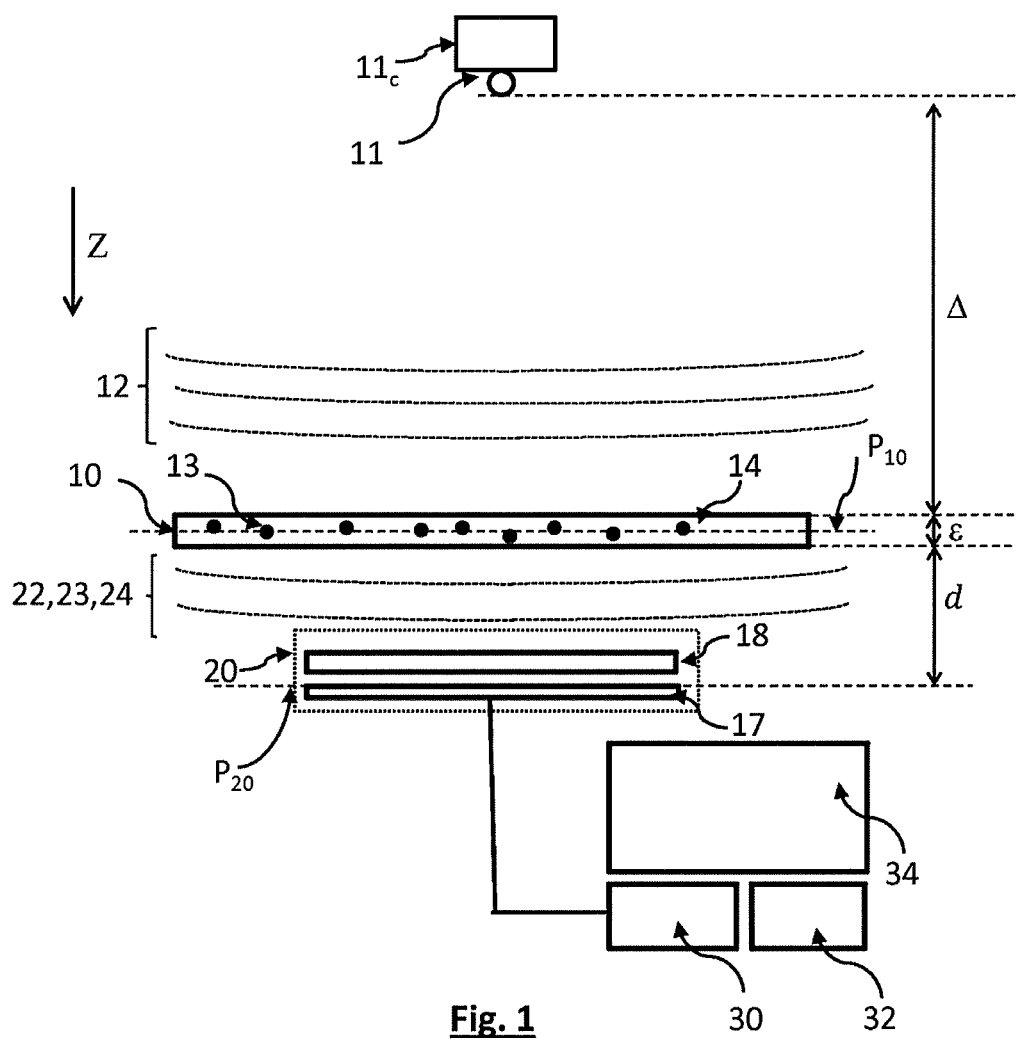

FIG. 1 shows an exemplary device that is one subject of the invention. A laser diode 11 is able to produce a light wave 12, termed incident light wave, in the direction of a sample 10, along a propagation axis Z. In this example, the laser diode is a diode marketed by Civillaser, emitting at a wavelength close to 405 nm. The laser diode thus emits in the visible spectral domain.

The sample 10 may be a biological sample that it is desired to characterize. The sample 10 may also include a solid or liquid medium 14 containing particles 13 to be characterized. This may involve for example biological particles in a culture medium or in a bodily fluid. Biological particle is understood to mean a cell, a bacterium or other micro-organism, a fungus, a spore, etc. The term particles may also refer to microbeads, for example metal microbeads, glass microbeads or organic microbeads, commonly used in biological protocols. This may also involve insoluble droplets suspended in a liquid medium, for example lipid droplets in an oil-in-water emulsion. Thus, the term particle refers both to endogenic particles initially present in the examined sample, and exogenic particles that are added to this sample before analysis. Generally, a particle has a size advantageously smaller than 1 mm, or even smaller than 500 µm, and preferably a size of between 0.5 µm and 500 µm. The thickness c of the sample 10 allows a portion of the incident light 12 to be transmitted to the image sensor 20, forming what is termed a transmitted light wave 22. When the sample is a liquid containing particles, the thickness ε may be between a few tens of microns and a few millimeters, or even centimeters, depending on the attenuation of the incident light by the sample.

According to another example, the sample may be a thin slide of tissue, or anatomical pathology slide, including a thin thickness of tissue deposited on a transparent slide. Thin thickness is understood to mean a thickness preferably less than 100 µm, and preferably less than 10 µm, typically a few micrometers.

The distance A between the laser diode and the sample is preferably greater than 1 cm. It is preferably between 2 and 30 cm. Preferably, the laser diode, seen by the sample, is considered to be point-like. This means that its diameter (or its diagonal) is preferably smaller than one tenth, and better still one hundredth, of the distance between the sample and the laser diode. Thus, the light preferably reaches the sample in the form of planar waves, or waves that may be considered as such.

The device includes an image sensor 20 able to form an image in a detection plane $P_{20}$. In the example shown, this is a matrix-array photodetector including a matrix-array of pixels, of CCD type or a CMOS. CMOS are the preferred image sensors because the size of the pixels is smaller, thereby allowing images to be acquired whose spatial resolution is more favorable. The image sensor comprises a matrix-array of pixels 17, above which matrix-array there is positioned a transparent protective window 18. In this example, the transparent protective window 18 is positioned 125 µm away from the matrix-array of pixels 17, and its thickness reaches 400 μm. The distance between the matrix-array of pixels 17 and the protective window 18 is generally between a few tens of μm to 150 or 200 μm. In this example, the detector is an 8-bit CMOS sensor comprising 3884×2764 pixels, with an inter-pixel pitch of 1.67 μm. The detection plane $P_{20}$ preferably extends perpendicular to the propagation axis Z of the incident light wave 12. Image sensors whose inter-pixel pitch is smaller than 3 μm are preferred in order to improve the spatial resolution of the image.

In this example, the distance d between the sample 10 and the matrix-array of pixels 17 of the image sensor 20 is less than 2 cm, and preferably less than 1 cm. It is for example of the order of 5 mm. The proximity of the sample 10 and of the image sensor 20 makes it possible to obtain a wide field of observation. Alternatively, it is possible to move the sample closer to the laser diode, in which case the field of observation decreases. However, such a configuration makes it possible to obtain more detailed information with regard to the sample.

It is noted that there are no image-forming optics, for example magnifying optics between the image sensor 20 and the sample 10. This does not rule out the possible presence of focusing microlenses at each pixel of the image sensor 20, these microlenses not having an image magnification function.

Under the effect of the incident light wave 12, the sample 10 may create a diffracted wave 23 that is liable, in the detection plane $P_{20}$, to produce interference, in particular with the light wave 22 transmitted by the sample. This interference gives rise, on the image 25 acquired by the image sensor 20, to a plurality of elementary diffraction patterns 26, each elementary diffraction pattern including a central area and a plurality of concentric diffraction rings, each ring constituting a circular interference fringe. Each elementary diffraction pattern results from a diffractive object 13 in the sample, in this case a particle. The light wave 24 to which the image sensor 20 is exposed comprises:
- a component 23 resulting from the diffraction of the incident light wave 12 by the sample;
- a component 22 resulting from the transmission of the incident light wave 12 by the sample.

These two components create interference on the image 25 acquired by the image sensor, this interference taking the form of elementary diffraction patterns 26. Examples of elementary diffraction patterns will be shown later on with reference to FIGS. 3A to 3F or 7A and 7B. Generally, an elementary diffraction pattern 26 may be associated with each diffractive element in the sample. The closer the sample 10 is brought to the laser diode 11, the more detailed the elementary diffraction patterns 26, the number of rings identifiable on the image sensor being higher. The closer the sample 10 is brought to the image sensor 20, the larger the field of observation, leading to the observation of a higher number of elementary diffraction patterns 26 on one and the same image 25.

A processor 30, for example a microprocessor, is able to process each image 25 acquired by the image sensor 20. In particular, the processor is a microprocessor linked to a programmable memory 32 in which there is stored a sequence of instructions for performing the image processing and computing operations described in this description. The processor 30 may also be linked to a screen 34.

One example of image processing is the application of a holographic reconstruction algorithm that makes it possible to reconstruct an image 28, termed reconstructed image, from the image 25 acquired by the image sensor. This type of algorithm is conventional and will be discussed later in the description with reference to FIGS. 6A to 6F.

The laser diode 11 is linked to an electrical circuit $11_c$, allowing the laser diode to be supplied with an electric current. The laser diode 11 includes an active zone, made from a semiconductor material. Beyond a certain intensity value, termed laser threshold intensity $i_s$, laser emission is observed. This laser threshold intensity $i_s$ corresponds to an injection of electrons that is sufficient to obtain a laser effect in the active zone of the laser diode.

Figure 2A:
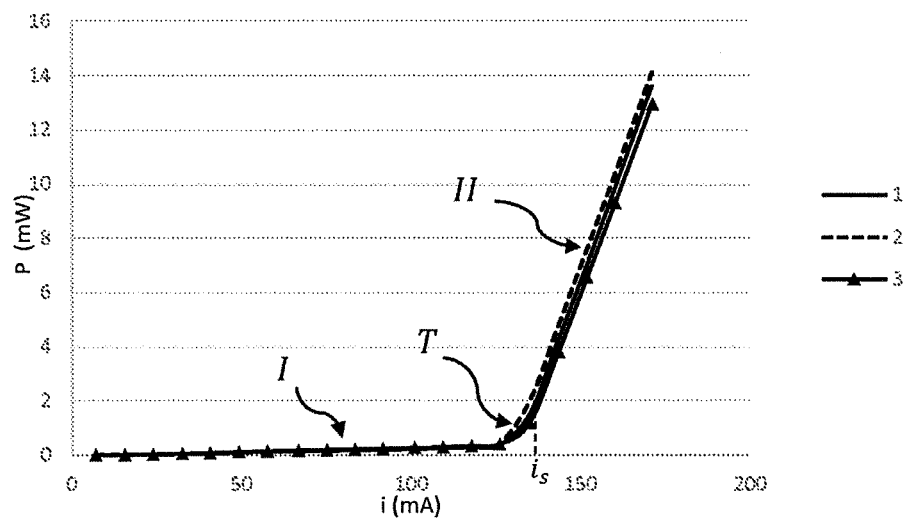

The laser diode that is used is intended to be supplied with a supply current whose nominal intensity $i_n$ is equal to 150 mA. The inventors measured the optical power delivered by the laser diode using an optical power meter, as a function of the intensity i of the supply current. Three measurements were performed, at three different instants 1, 2 and 3, by varying the intensity i of the supply current on either side of the nominal intensity, between 15 mA and 170 mA. The curves that were obtained are shown in FIG. 2A. What is observed is a variation in the optical power characteristic of a laser diode. Each curve has:
- a first portion, in which the injection of charges into the active zone is insufficient. In this first operating regime I, the emission of light by the laser diode is said to be spontaneous, and the emitted light power is proportional to the density of charge carriers injected into the active zone, that is to say to the intensity i of the supply current;
- a second portion, in which the injection of charges is sufficient to significantly increase the output of the laser diode, reflected in an appearance of what is termed stimulated light emission. In this second operating regime II, or laser operating regime, a laser effect is obtained and the optical power increases linearly with the intensity i, with an amplification effect reflected in an increase in the gradient of the curve. The nominal intensity $i_n$ of the laser diode, equal to 150 mA, corresponds to this operating regime.

A transition between the first and second operating regimes occurs between 125 mA and 135 mA, without a precise value being able to be established. Specifically, the properties of the laser diode fluctuate, in particular as a function of the temperature. Moreover, there is what is termed a transient operating regime T, between the two operating regimes outlined above, in which the emission of the diode is stimulated without thereby compensating for certain losses of the diode. The evolution of the optical power with the intensity is no longer linear on account of said losses. In the curves that are shown, this transient regime extends between intensities i of the supply current of between 120 and 135 mA. It may then be considered that the threshold intensity value $i_s$, corresponding to a supply current of the diode, termed laser threshold current, is 140 mA.

In this description, the threshold intensity $i_s$ denotes the intensity beyond which amplification of the stimulated light takes place, this corresponding to the minimum intensity of the laser operating regime (regime II) described above. As may be observed in FIG. 2A, this threshold intensity $i_s$ is the intensity beyond which the optical power, resulting from the laser effect, increases linearly with the intensity of the supply current of the laser diode.

Figure 2B:
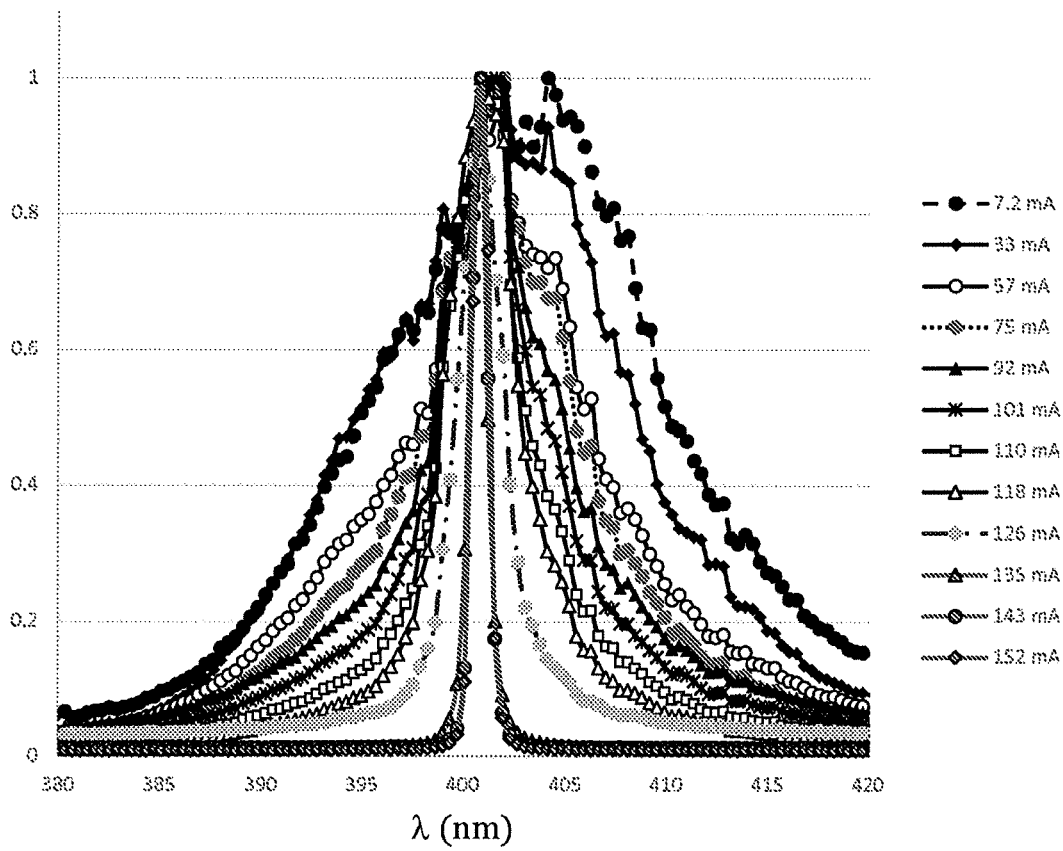

At each value of the intensity i, the emission spectrum of the light wave 12 produced by the laser diode 11 has also been determined using a spectrometer. The various spectra are depicted in FIG. 2B. Each spectrum has an emission peak centered on a central wavelength $\lambda_c$ of 401 nm. As expected, an enlargement of the emission peak is observed as soon as the intensity i of the supply current is below the threshold value $i_s$.

The coherence length $L_c$ of the light wave 12 produced by the laser diode 11 may be determined using the following expression:

$$L_c = \frac{2\ln(2)}{\pi} \times \frac{\lambda^2}{\Delta\lambda} \quad (1)$$

where $\lambda$ denotes the wavelength and $\Delta\lambda$ represents the width of the emission peak.

This expression holds true under the proviso that the peak of the emission spectrum is similar to a Gaussian distribution, which is the assumption adopted in this example.

The coherence length $L_c$ reflects the fact that if two objects, behaving as secondary light sources, for example reflective or diffractive objects, are spaced apart by a distance shorter than the coherence length, the light waves emitted by these objects form interference.

Figure 2C:
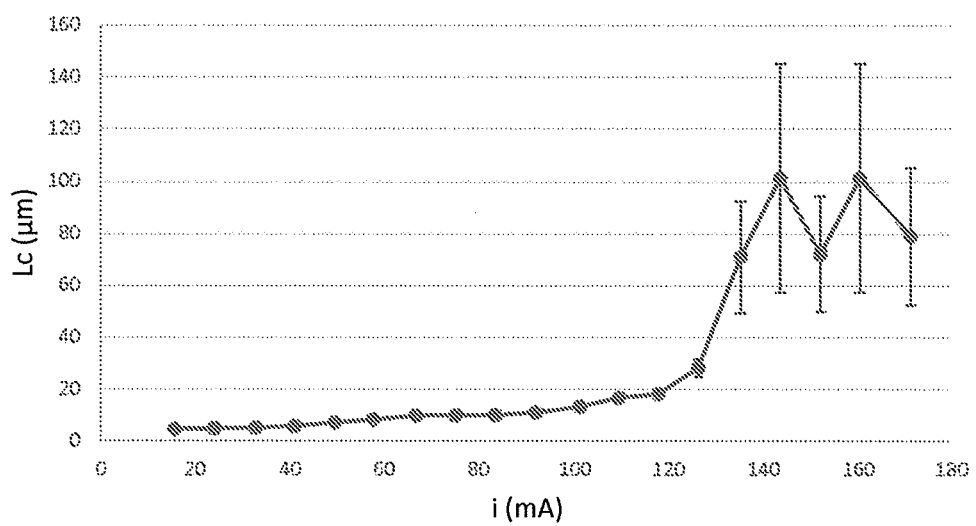

FIG. 2C shows the coherence length $L_c$ of the light wave 12 emitted by the laser diode as a function of the intensity i of the supply current. This coherence length is short, of the order of a few tens of microns, and less than 50 microns (micrometers), or even 20 microns, when the intensity i of the supply current is less than the threshold intensity $i_s$. Beyond the intensity threshold $i_s$, the coherence length reaches or even exceeds 100 μm, and is not able to be determined with high precision on account of the spectral resolution of the spectrometer that is used.

Coherence length $L_c$ is a parameter that determines the ability of an observed sample to form interference that is able to be detected. In the example shown in FIG. 1, the sample includes a transparent liquid 14, or a liquid able to be considered as such, in which particles 13 are suspended. These particles are diffractive and give rise to the appearance of diffraction patterns 26 on the images 25 formed by the image sensor 20.

The inventors studied the effect of varying the intensity i of the supply current of the laser diode 11 on the images acquired by the image sensor 20. FIGS. 3A, 3B, 3C, 3D, 3E and 3F respectively represent images of a sample, while the intensity i of the supply current of the laser diode is equal to 41 mA, 67 mA, 92 mA, 110 mA, 126 mA and 135 mA, respectively. Elementary diffraction patterns 26 appear in these figures, the majority of these patterns being able to be associated with a particle 13 present in the sample 10. In this example, the sample consists of a mixture of latex beads with diameters of 3 μm and 6 μm that are located in a saline buffer of PBS (acronym for phosphate buffered saline) type. On each of these images, the exposure time was adjusted such that the mean gray level of each image is similar, such that these images are comparable in spite of the evolution of the illumination power. It may be observed that, when the intensity of the supply current increases, the number of rings forming each diffraction pattern tends to increase, this being expected as these rings correspond to circular interference fringes. Thus, the information present in the image is richer. Moreover, as indicated with reference to the prior art, such diffraction patterns may undergo holographic reconstruction, and it is accepted that the results of such a reconstruction are improved when the number and the contrast of the diffraction rings increase.

Another observation is the appearance of transverse interference fringes 29 that are substantially rectilinear and extend across the image when the intensity of the supply current is greater than or close to the threshold intensity $i_s$. The appearance of these transverse interference fringes significantly impairs the signal-to-noise ratio of the image. In contrast to the concentric interference fringes, forming the elementary diffraction patterns 26, located in some portions of an image 25 formed by the image sensor 20, the transverse interference fringes 29 extend through the entire image. They constitute noise that affects both the areas of the image having elementary diffraction patterns 26 and the areas of the image, forming the background of the image, that do not have elementary diffraction patterns. These transverse fringes may be rectilinear, elliptical or circular. The term transverse denotes the fact that they impact the whole image 25, extending from one edge of this image to the other.

Figure 4A:
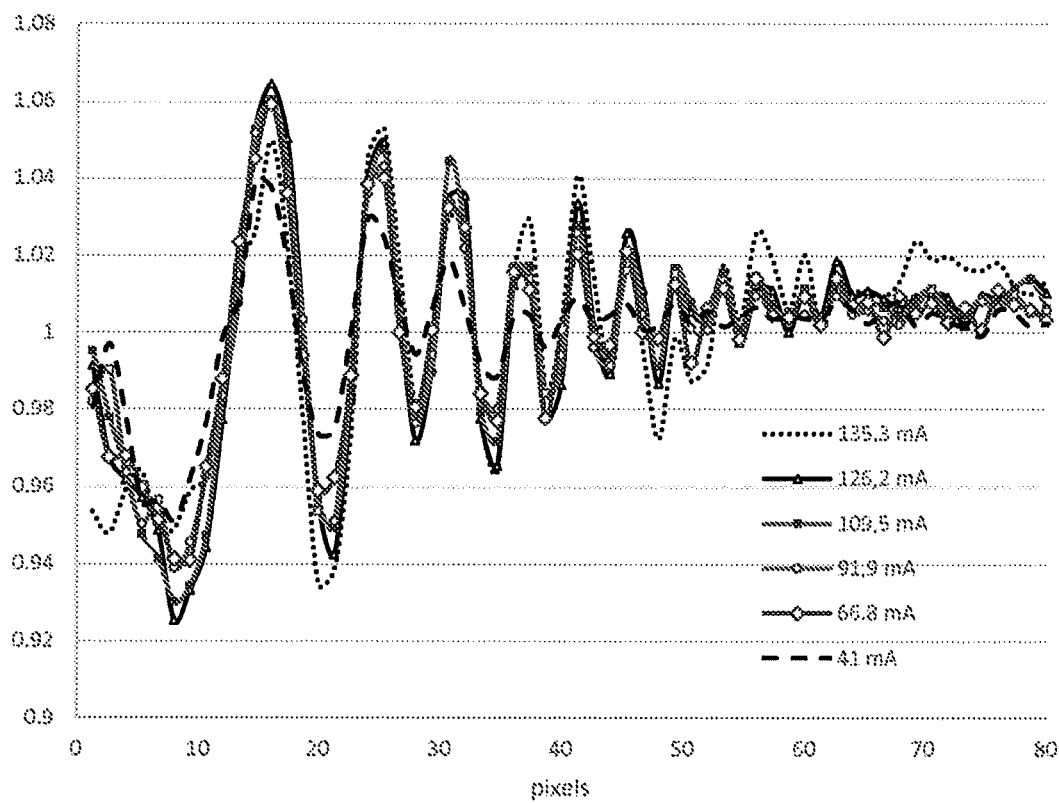
FIG. 4A shows the evolution of the radial profile of a diffraction pattern present in FIGS. 3A, 3B, 3C, 3D, 3E and 3F as a function of the intensity of the supply current of the laser diode.

One elementary diffraction pattern 26 has been selected on each image 25, for which pattern a mean radial profile has been established. Mean radial profile is understood to mean an amplitude profile obtained by determining a mean of various elementary profiles, each elementary profile being taken along an axis 27 extending between the center of the selected diffraction pattern and an end of said figure. For one and the same diffraction pattern 26, several axes 27 are considered, as shown in FIG. 3A, in which the axes 27 are shown in the form of white dots. The selected elementary pattern 26 on each image is framed by a frame of white dots. FIG. 4A shows the mean radial profile obtained on each of the images 3A to 3F. It is observed that the more the intensity i increases, the higher the number of rings.

Figure 4B:
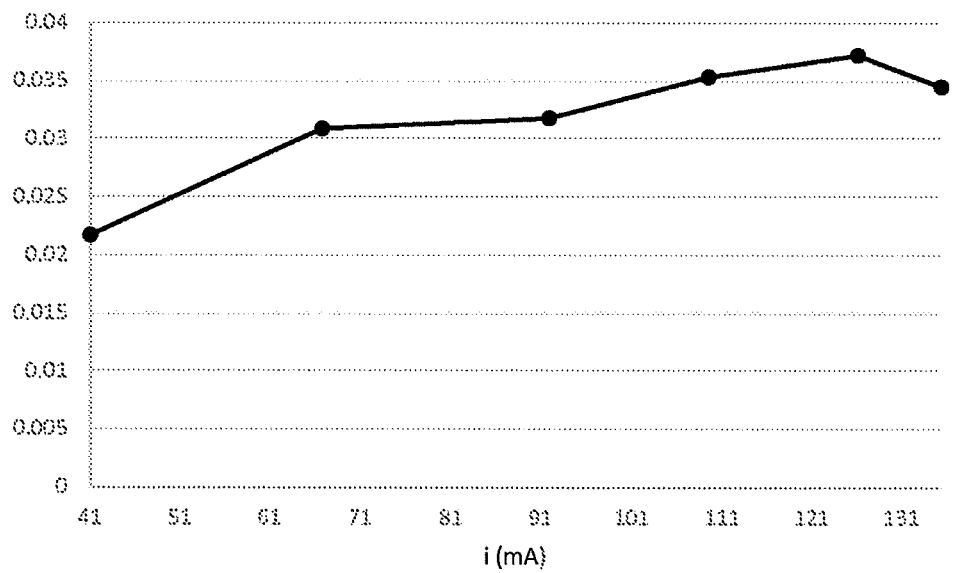
FIG. 4B shows the evolution of the standard deviation of the profile shown in FIG. 4A as a function of the intensity of the supply current of the laser diode.

The standard deviation of each radial profile shown in FIG. 4A has been determined. FIG. 4B illustrates the evolution of this standard deviation as a function of the intensity i of the supply current of the laser diode 11. This indicator is representative of the contrast of the selected diffraction pattern, taking into account all of the identifiable diffraction rings. It reaches a maximum at i=121 mA, and then decreases when the intensity exceeds this value. The higher the contrast of a diffraction pattern, the more this pattern is identifiable and the better the quality of an image reconstructed on the basis of this diffraction pattern will be. FIGS. 3A to 3F, and also FIGS. 4A and 4B, show that there is an optimum intensity range for the supply current of the diode, between 60 mA and 125 mA, in which the contrast of the diffraction patterns 26 is high. They also show that, beyond 130 mA, the appearance of interference fringes, impacting the entire image 25, considerably increases the noise level of the image. Moreover, this noise is not stationary, which makes it difficult to eliminate. It is thus important to use the laser diode by adjusting its supply current such that its intensity i is high enough for the diffraction patterns to be contrasted and have a sufficient number of diffraction rings, while at the same time being lower than an intensity, termed critical intensity $i_c$, beyond which interference fringes appear that extend through the image 25 acquired by the image sensor 20. It is observed that, in this example, the optimum range for the intensity of the supply current extends between 60 mA and 135 mA, that is to say around 0.5 times the threshold intensity $i_s$ and said threshold intensity $i_s$, and appears to be particularly optimal between 80 mA and 120 mA, that is to say between 0.6 times and 0.9 times said threshold intensity $i_s$.

Figure 5A:
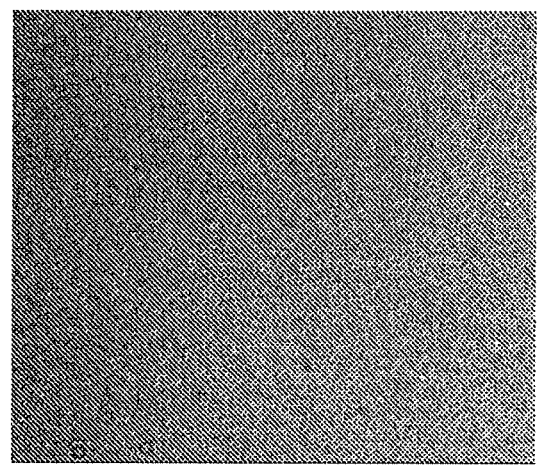
FIGS. 5A and 5B show images obtained using the device shown in FIG. 1, without a sample interposed between the laser diode and the image sensor, the intensity of the supply current of the laser diode being brought respectively to two different values, below and above, respectively, what is termed a threshold intensity.
Figure 5B:
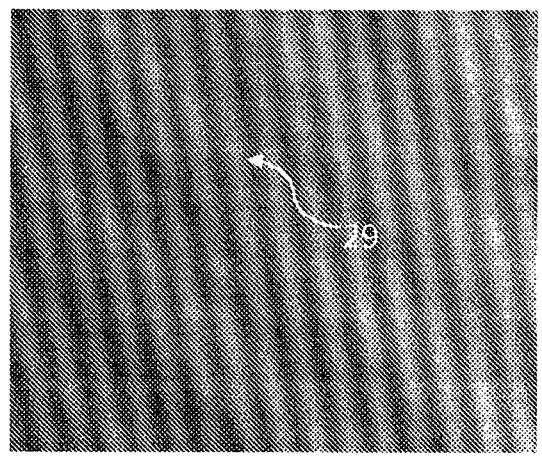

FIGS. 5A and 5B show images obtained by the image sensor 20 without interposing the sample 10 between the image sensor 20 and the laser diode 11, the intensity i of the supply current being respectively equal to 120 mA, that is to say below the threshold intensity $i_s$, and 140 mA, that is to say greater than or equal to the threshold intensity. The appearance of interference fringes is observed when the intensity exceeds a critical value $i_c$, the latter being less than or equal to the threshold intensity $i_s$. It appears that an excessively long coherence length is detrimental to the quality of the images acquired by the sensor. It is therefore preferable to adjust the intensity i of the supply current of the laser diode such that the coherence length of the light wave 12 emitted by the laser diode is less than 100 µm, or even less than 80 µm or 50 µm. The inventors put the appearance of such interference fringes down to stray reflections occurring between the matrix-array of pixels 17 and the protective window 18 of the detector, about 100 µm away from said matrix-array of pixels. Such interference fringes may also appear when the sample has two parallel interfaces that are separated by this order of magnitude. Typically, the thickness E of an observed sample is between 20 µm and 200 µm, or even 500 µm.

Figure 5C:
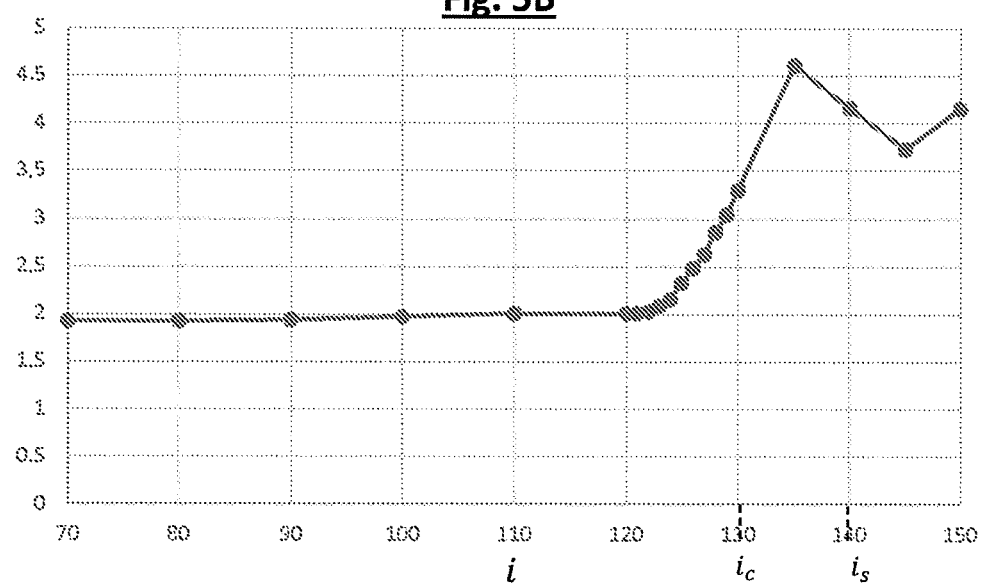
FIG. 5C shows an evolution of a coefficient of variation representative of a background of images obtained using the device shown in FIG. 1, a fluid chamber filled with liquid being interposed between the laser diode and the image sensor, this coefficient of variation changing as a function of the intensity of the supply current of the laser diode.

The inventors evaluated the evolution of a coefficient of variation CV of images acquired by the image sensor 25 by varying the intensity i of the supply current of the laser diode 11 between 70 mA and 150 mA, the sample 10 consisting of a fluid chamber of thickness ε=100 µm, filled with a saline buffer, without diffractive particles. Coefficient of variation CV of an image is understood to mean the standard deviation of the image divided by the mean of said image. The exposure time of each image was adjusted such that the mean intensity of each image is constant, so as to compensate for the variation in the illumination power of the diode. This coefficient of variation was calculated by excluding certain portions of the image having stray diffraction patterns. It is therefore representative of the 'background' of each image, that is to say of the area not having possible diffraction patterns. FIG. 5C shows the evolution of this coefficient of variation CV as a function of the intensity i of the supply current of the laser diode. Stability between 70 mA and 120 mA is observed, followed by a significant increase reflecting the appearance of patterning in the image, that is to say the interference fringes outlined above with reference to FIGS. 3F and 5B.

The inventors observed that, by positioning a sample between the image sensor and the laser diode, the critical intensity varied. It therefore appears that the appearance of the interference fringes is also dependent on the sample 10 positioned between the laser diode 11 and the image sensor 20.

On account of this, the intensity i of the supply current of the laser diode 11 is preferably adjusted on a case by case basis, by performing the following steps, termed preliminary steps:

acquiring an initial image, under nominal conditions of use of the laser diode, that is to say by adopting an intensity i of the supply current greater than the threshold intensity $i_s$, such that the light wave 12 emitted by the laser diode is obtained by laser effect. This image has transverse interference fringes that make it unsuitable for holographic reconstruction;

varying the intensity i of the supply current of the laser diode, and in particular reducing this intensity, and acquiring an image using the image sensor, this step being repeated until a significant attenuation of the transverse interference fringes is observed. When such an attenuation is observed, it is considered that the intensity of the supply current of the laser diode corresponds to said critical intensity $i_c$.

The intensity i of the supply current of the laser diode 11, which is conducive to the observation of a sample by lensless imaging, is then determined as a function of this critical intensity $i_c$. It may be equal to this critical intensity, or slightly lower, for example between 0.8 $i_c$ and $i_c$. Specifically, it is considered that this intensity i should preferably be close to the critical intensity. Above this, the interference fringes appear. Below this, the optical power decreases. By going below the critical intensity, for example below 0.9 $i_c$ or 0.95 $i_c$, possible fluctuations of the critical intensity, for example under the effect of drifting of the laser diode, for example thermal drifting, are overcome. Such a 'safety margin' may prove useful.

The abovementioned steps are qualified as preliminary steps because they are implemented prior to the observation of a sample. They are preferably performed by positioning what is termed a reference sample $10_{ref}$, which is representative of the samples to be observed hereinafter. They may also be implemented without a sample, the image sensor 20 being positioned directly facing the laser diode 11, without an interposed sample.

Two consecutive interference fringes may be characterized by a contrast indicator ind, representing a difference between a maximum intensity level $S_{max}$, representative of a light fringe, and a minimum intensity level $S_{min}$, representative of a dark fringe adjacent to said light fringe. The contrast indicator may be obtained by a simple subtraction $S_{max}-S_{min}$, or by normalizing this difference by an addition $S_{max}+S_{min}$.

Thus, the contrast indicator may be expressed as follows:

$$ind = S_{max} - S_{min} \text{ or} \tag{2}$$

$$ind = \frac{S_{max} - S_{min}}{S_{max} + S_{min}}, \tag{3}$$

expression (3) corresponding to a conventional definition of the contrast.

The critical intensity $i_c$ is reached when the interference fringes no longer appear significantly on the image acquired by the image sensor, or when they are attenuated sufficiently significantly. Thus, an attenuation that is said to be significant corresponds to a decrease in the contrast indicator ind, in relation to the transverse interference fringes, of 25%, or even 50%, or even 80% or more, between the initial image and the image obtained at the critical intensity.

As outlined above, each image 25 acquired by the image sensor may undergo holographic reconstruction, aimed at convolving said image using a propagation operator h(x,y,z). The role of the propagation operator h(x,y,z) is to describe propagation of the light between the image sensor 20 and a point of coordinates (x,y,z). The principles of holographic reconstruction are described for example in the publication Ryle et al, 'Digital in-line holography of biological specimens', Proc. Of SPIE Vol. 6311 (2006). A holographic reconstruction makes it possible to determine a complex expression U(x,y,z) for the light wave 24 to which the detector is exposed at any point of coordinates (x,y,z) in space, and in particular in a plane situated at a distance |z| from the image sensor. It is then possible to determine the amplitude u(x,y,z) and the phase φ(x,y,z) of this light wave using the expressions:

$$u(x,y,z)=\text{abs } [U(x,y,z)] \tag{4},$$

$$\text{or } \varphi(x,y,z)=arg[U(x,y,z)] \tag{5}.$$

The operators abs and arg return the modulus and the argument, respectively.

The digital reconstruction may in particular be based on the Fresnel diffraction model. In this example, the propagation operator is the Fresnel-Helmholtz function, such that:

$$h(x, y, z) = \frac{1}{j\lambda z} e^{j2\pi \frac{z}{\lambda}} \exp\left(j\pi \frac{x^2 + y^2}{\lambda z}\right). \quad (6)$$

where λ denotes the wavelength.
Thus, $$U(x, y, z) = \quad (7)$$
$$\frac{1}{j\lambda z} e^{j2\pi \frac{z}{\lambda}} \int\int \sqrt{S(x', y')} \exp\left(j\pi \frac{(x-x')^2 + (y-y')^2}{\lambda z}\right) dx' dy'$$

where
x' and y' denote the coordinates in the plane of the image sensor;
S(x', y') represents the intensity of the image acquired by the image sensor at the coordinates x' and y';
x and y denote the coordinates in the reconstruction plane, the latter being located at a distance |z| from the image sensor;
z denotes the coordinate of the reconstructed image along the propagation axis Z of the incident light wave.

The inventors obtained an image 25, using the device shown in FIG. 1, by positioning two latex beads with an edge-to-edge diameter of 6 μm on the bottom of a fluid chamber with a thickness of 100 μm, filled with a PBS saline buffer as defined above. The image 25 was acquired using the image sensor 20 by modulating the intensity i of the supply current of the laser diode 11 between 41 mA and 135 mA.

Figure 6A:
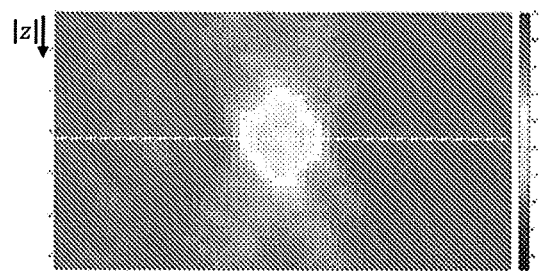
FIGS. 6A, 6B, 6C, 6D, 6E and 6F show, as a function of a reconstruction distance, the intensity of pixels extending along a line in a reconstructed image, said image being obtained by applying a holographic reconstruction algorithm respectively to images, acquired by the image sensor, of two beads obtained using various intensities of the supply current of the laser diode.
Figure 6B:
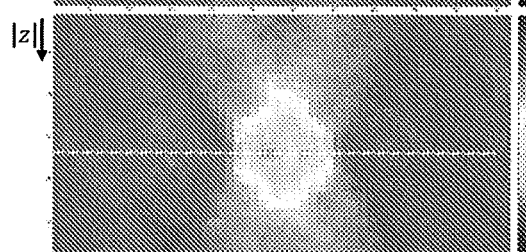
Figure 6C:
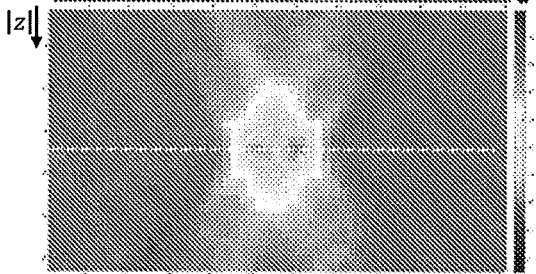
Figure 6D:
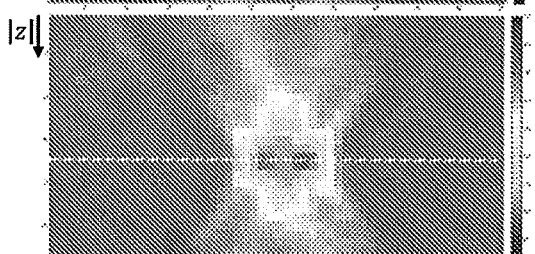
Figure 6E:
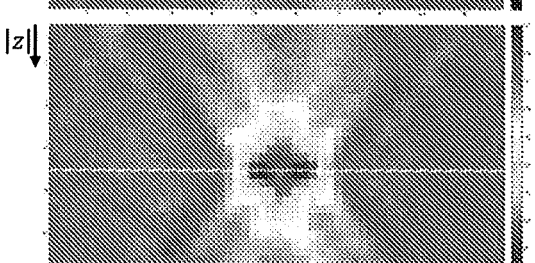
Figure 6F:
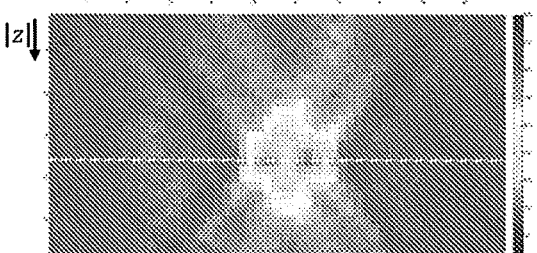

This image underwent holographic reconstruction, in accordance with the principles outlined above, with consideration to a value of z equal to the distance between the image sensor and said beads. The images 6A, 6B, 6C, 6D, 6E and 6F show the intensity of the pixels of the reconstructed images 28 as a function of the reconstruction distance 14. More precisely, each image represents a distribution of the intensity of the pixels situated along a line passing through the two beads, as a function of the reconstruction distance |z|, the intensity i of the supply current of the laser diode 11 reaching 41 mA, 67 mA, 92 mA, 110 mA, 126 mA and 135 mA, respectively. The dotted line corresponds to a reconstruction distance equal to the distance between the detector and the beads. It is observed that FIG. 6E, corresponding to i=126 mA, is optimum, with the knowledge that images 6D (i=110 mA) or 6C (i=92 mA) also enable clear separation of the beads on the reconstructed image 28. FIG. 6F (i=135 mA) enables satisfactory separation, but is impacted by a high background noise in the rest of the image, on account of the presence of the transverse interference fringes described above.

Figure 7A:
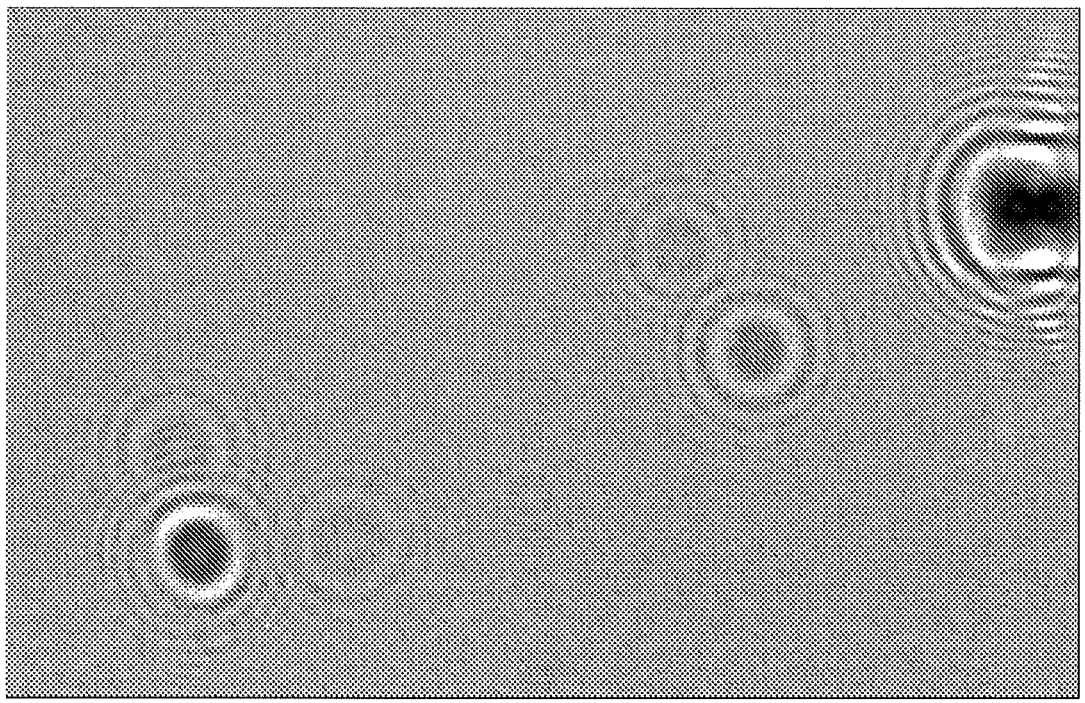
FIG. 7A shows an image of a sample, which image is obtained using a prior art device, the light source being a light-emitting diode.
Figure 7B:
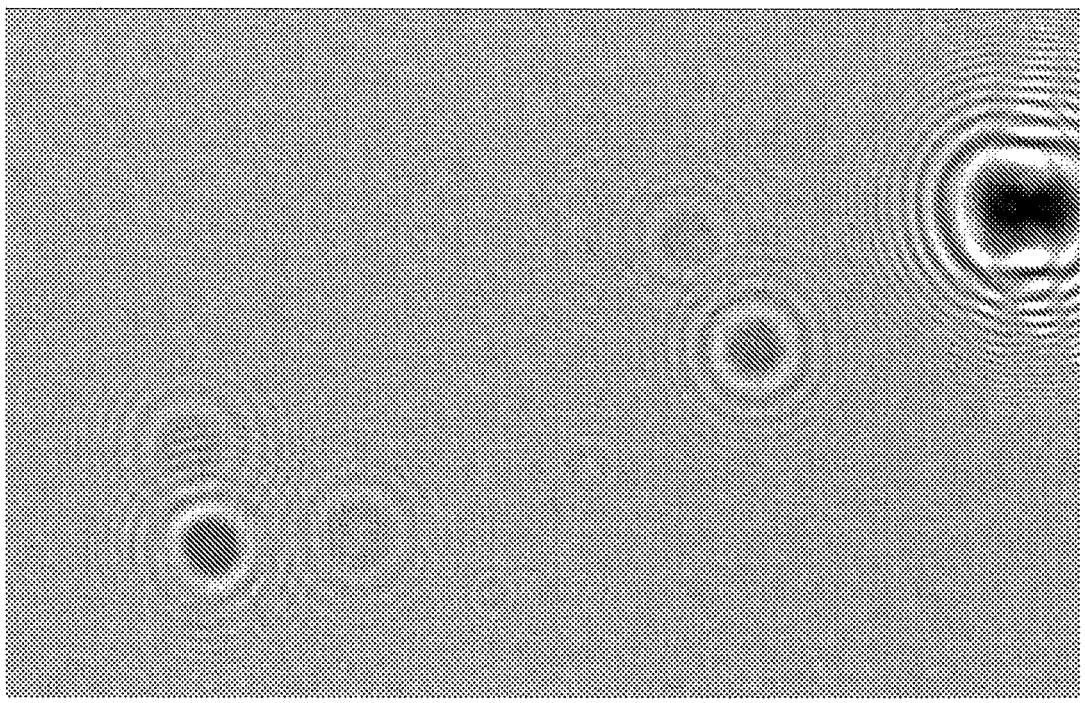
FIG. 7B shows an image of a sample, which image is created using a device according to the invention, the intensity of the laser diode being expediently adjusted.

FIGS. 7A and 7B show images acquired using an image sensor when the light source is a blue light-emitting diode and a laser diode, respectively, whose intensity is equal to the critical intensity $i_c$, in this case 125 mA. The diffraction patterns formed in FIG. 7B include more identifiable diffraction rings than are formed in FIG. 7A.

The use of a laser diode, under the proviso of adjusting the intensity of its supply current, makes it possible to obtain a more precise observation of a sample.

The invention may be implemented in bodily fluid analysis, for the purpose of detecting and/or identifying particles forming said fluid. It may also allow characterization of thin slides of biological tissue. Outside of biology, the invention may apply to the detection and/or identification of particles in industrial fluids, in the agri-food sector, or in solid matrices.

The invention claimed is:

1. A method for observing a sample, comprising:
   a) illuminating the sample using a laser diode that is configured to emit an incident light wave propagating toward the sample, the laser diode being supplied with a supply current, such that a laser effect is obtained when an intensity of the supply current exceeds a threshold intensity;
   b) acquiring, using an image sensor, an image of the sample, the sample being positioned between the laser diode and the image sensor, each image being representative of a light wave transmitted by the sample under effect of the illumination;
   wherein the intensity of the supply current of the laser diode is less than or equal to a critical intensity, the critical intensity being determined, prior to a), according to preliminary operations, comprising:
   i) positioning the laser diode such that the emitted incident light wave propagates toward the image sensor;
   ii) supplying the laser diode with an initial supply current whose intensity is greater than or equal to the threshold intensity, and acquiring an initial image, using the image sensor, the initial image having transverse interference fringes;
   iii) modifying the intensity of the supply current and acquiring an image using the image sensor, the modifying being repeated until an image is acquired that has transverse interference fringes that are attenuated in comparison with the initial image, the intensity of the supply current then corresponding to the critical intensity.

2. The method of claim 1, wherein the critical intensity is less than the threshold intensity.

3. The method of claim 2, wherein the critical intensity is between 0.7 times the threshold intensity and the threshold intensity, or between 0.8 times the threshold intensity and the threshold intensity.

4. The method of claim 1, wherein, on the initial image, two adjacent transverse interference fringes are characterized by a contrast indicator representative of a contrast between the interference fringes, the critical intensity corresponding to a reduction in the contrast indicator of a factor greater than 25%.

5. The method of claim 1, wherein, in i) to iii), a reference sample, representative of the observed sample, is positioned between the image sensor and the laser diode.

6. The method of claim 1, wherein, in i) to iii), no sample is positioned between the image sensor and the laser diode.

7. The method of claim 1, wherein the sample includes a diffractive element, forming a diffraction wave under the effect of the illumination by the light wave, such that the image sensor is exposed to an exposure wave, including the incident light wave transmitted by the sample, and the diffraction wave.

8. The method of claim 1, wherein, in b), the intensity of the supply current is between 0.5 times the threshold intensity and the threshold intensity, or between 0.7 times the threshold intensity and the threshold intensity.

9. The method of claim 1, wherein, in b), the intensity of the supply current is between 0.5 times the threshold intensity and 0.9 times the threshold intensity, or between 0.7 times the threshold intensity and 0.9 times the threshold intensity.

10. The method for observing a sample of claim 1, wherein no magnifying optics extend between the sample and the image sensor.

11. A method for observing a sample, comprising:
  a) illuminating the sample using a laser diode that is configured to produce an incident light wave, propagating toward the sample;
  b) acquiring, using an image sensor, an image of the sample, formed in a detection plane, the sample being positioned between the laser diode and the image sensor, each image being representative of a light wave transmitted by the sample under effect of the illumination;
  wherein:
  the laser diode has associated with it a threshold intensity, corresponding to an intensity of a supply current of the diode beyond which a laser effect is obtained; and
  when the sample is illuminated, the laser diode is supplied supply current whose intensity is between 0.5 times the threshold intensity and the threshold intensity.

12. The method of claim 11, wherein the laser diode is supplied with a supply current whose intensity is between 0.7 times the threshold intensity and 0.9 times the threshold intensity.

* * * * *

UNITED STATES PATENT AND TRADEMARK OFFICE
CERTIFICATE OF CORRECTION

PATENT NO. : 11,221,290 B2
APPLICATION NO. : 16/065527
DATED : January 11, 2022
INVENTOR(S) : Blandin It is certified that error appears in the above-identified patent and that said Letters Patent is hereby corrected as shown below:

On the Title Page

Column 1, Item (72) Inventor, Line 1, change "Coublevi" to -- Coublevie --; and

In the Claims

Column 13, Claim 11, Line 22, change "supply current" to -- with a supply current --.

Signed and Sealed this
Fifth Day of July, 2022

Katherine Kelly Vidal
*Director of the United States Patent and Trademark Office*